United States Patent [19]

Inoue et al.

[11] 4,075,648

[45] Feb. 21, 1978

[54] ELECTRIC SHUTTER MEANS EQUIPPED WITH A SELF-TIMER MECHANISM

[75] Inventors: Nobuyoshi Inoue; Munetaka Shimizu, both of Kawagoe, Japan

[73] Assignee: Copal Company Limited, Tokyo, Japan

[21] Appl. No.: 683,615

[22] Filed: May 5, 1975

[30] Foreign Application Priority Data

May 10, 1975 Japan .............................. 50-62738[U]

[51] Int. Cl.$^2$ .............................................. G03B 9/64
[52] U.S. Cl. ................................. 354/238; 354/23 D; 354/50; 354/51; 354/60 R; 354/239; 354/266; 354/267
[58] Field of Search ................. 354/50, 51, 60 R, 237, 354/238, 239, 266, 267, 23 D

[56] References Cited

U.S. PATENT DOCUMENTS

| 3,921,187 | 11/1975 | Kobori et al. | 354/237 |
| 3,921,188 | 11/1975 | Imura et al. | 354/50 |

*Primary Examiner*—Russell E. Adams
*Attorney, Agent, or Firm*—Cushman, Darby & Cushman

[57] ABSTRACT

An electric shutter means so made that, in order to make the consumption of a current source battery as little as possible, during the period from the beginning of the operation of a self-timer by pressing a release button to the end of the operation, only the passage of an electric current to an electromagnet to start the motion of closing a rear blade may be prevented or a very small current may be made to flow to said electromagnet and, simultaneously with the closure of a current source switch by pressing the release button, an exposure warning circuit and exposure time indicating circuit may be held in an operating state.

2 Claims, 4 Drawing Figures

ELECTRIC SHUTTER MEANS EQUIPPED WITH A SELF-TIMER MECHANISM

BACKGROUND OF THE INVENTION a. Field of the Invention

This invention relates to electric shutter means for photographic cameras and, more particularly, to an electric shutter means equipped with a self-timer mechanism.

b. Description of the Prior Art

In a conventional electric shutter means equipped with a self-timer mechanism, in order to control the electric power consumption during the use of the self-timer, for example, an auxiliary switch is connected in series with a current source switch so as to be opened by the operation of cocking the self-timer so that, even if the camera releasing operation is made and the current source switch is closed, the current source may not be substantially connected with the circuit part, just before the end of the self-timer operation (just before the release of the shutter mechanism), said auxiliary switch may be closed and then, in the stage in which the shutter mechanism is released, the circuit part may be placed in a normal operating state.

However, in a recent electric shutter means, an exposure warning circuit and exposure time indicating circuit are mostly provided and use an exposure time controlling circuit which is to be a base, many circuit elements and a current source in common. Therefore, in preventing the current source from being connected with the circuit part by the self-timer cocking operation as in the above mentioned conventional electric shutter means, the exposure conditions must be checked and the exposure time must be indicated before the self-timer cocking operation. Thus said recent electric shutter means has been very inconvenient to use.

Further, in a single-lens reflex camera wherein an electric shutter means in which the brightness of an object to be photographed is memorized before a mirror leaps up so as to control the amount of exposure is contained and such releasing type that a mirror mechanism is operated by pressing the release button of the camera, a self-timer mechanism is released by the leaping up of the mirror, at the same time, a shutter mechanism is released and the shutter mechanism about to operate is once locked by the self-timer mechanism is taken, in preventing the current source from being connected with the circuit part by the self-timer cocking operation, no operation of memorizing the brightness of the object to be photographed is made at all as a result.

SUMMARY OF THE INVENTION

An object of the present invention is to provide an electric shutter means so made that, in order to eliminate such defects of the conventional electric shutter as are mentioned above, during the period of the operation of a self-timer, only the passage of an electric current to an electromagnet may be prevented or the amount of the passed current may be controlled to a minute value and, simultaneously with the closure of a current source switch by pressing a release button, circuit parts as an exposure warning circuit and an exposure time indicating circuit may be held in an operating state.

According to the present invention, this object can be attained by making it possible to connect an auxiliary switch or a resistor of large resistance value in series with an electromagnet so that, by the operation of cocking a self-timer, the above mentioned auxiliary switch may be opened through an element of the self-timer means or the above mentioned resistor may be connected in series with the electromagnet and, just before the completion of the operation of the self-timer, said auxiliary switch may be closed through the element of the self-timer means or said resistor may be short-circuited.

Another object of the present invention is to provide an electric shutter means of a high performance wherein the consumption of a current source battery is very little and, in case it is used for a single-lens camera or the like, a very proper memorizing-reproducing operation will be able to be made.

These and other objects of the present invention will become more apparent during the course of the following detailed description and appended claims.

DETAILED DESCRIPTION OF THE PREFERRED EMBODIMENT

Figure 1:
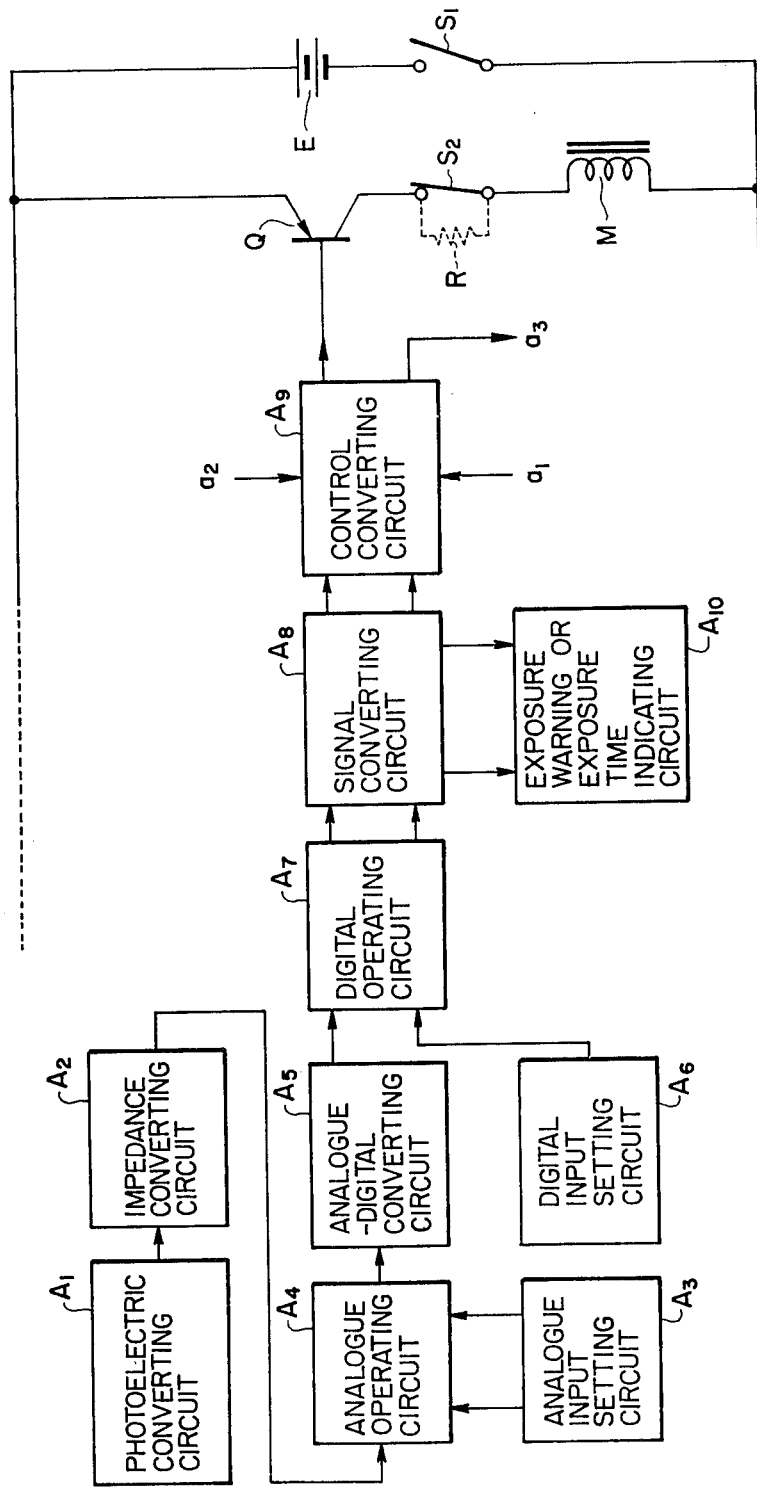
FIG. 1 is a block diagram showing a part in a wiring diagram in case the present invention is applied to an electric shutter means for single-lens reflex cameras.

First of all, on the basis of FIG. 1, there shall be explained an example of applying the present invention to an electric shutter means for single-lens reflex cameras, that is, an electric shutter means of a type so made that, before a reflecting mirror leaps up, the brightness of an object to be photographed may be memorized and, when the reflecting mirror leaps up or a front shutter curtain (or a front blade) runs, the above mentioned memorized information may be reproduced to control the amount of exposure.

In FIG. 1, the reference symbol $A_1$ denotes a photoelectric converting circuit, $A_2$ denotes an impedance converting circuit, $A_3$ denotes an analogue input setting circuit for setting, for example, a diaphragm aperture and/or film sensitivity, $A_4$ denotes an analogue operating circuit, $A_5$ denotes an analogue-digital converting circuit, $A_6$ denotes a digital input setting circuit for setting a diaphragm aperture and/or film sensitivity, $A_7$ denotes a digital operating circuit, $A_8$ denotes a signal converting circuit, $A_9$ denotes a control converting circuit, and $A_{10}$ denotes an exposure warning or exposure time digital indicating circuit. Further, reference symbols $a_1$ and $a_2$ denote respectively a diaphragm aperture controlling signal input and shutter controlling signal input given to the control converting circuit $A_9$ by the leaping up of the mirror or the running of the front shutter curtain (or the front blade), and $a_3$ denotes a diaphragm aperture controlling signal output generated from the control converting circuit $A_9$. Further, reference symbol Q denotes a transistor controlled by an output signal of the circuit $A_9$, M denotes an electromagnet for controlling an exposure time (for controlling a rear shutter curtain or blade), E denotes a current source, $S_1$ denotes a current source switch, and $S_2$ denotes an auxiliary switch to be opened by the operation of cocking a self-timer mechanism and closed just before the completion of the self-timer operation, that is, just before the substantial release of a shutter mechanism.

By the way, the diaphragm aperture and/or film sensitivity can be set as an analogue input or digital input. There may be at least one of the setting circuits.

As evident from the above described constitution, in case the self-timer is not used, the auxiliary switch $S_2$ will remain closed.

Further, in case the self-timer is cocked, the auxiliary switch $S_2$ will be only opened but the current source switch $S_1$ will not be operated at all. Therefore, even in this state, if the current source switch $S_1$ is closed, the other circuits than the circuit including the transistor Q and electromagnet M will properly operate so that the operation of measuring the light from the object to be photographed may be made and also the operation of indicating the exposure time may be properly made.

The relations between the self-timer mechanism and auxiliary switch $S_2$ shall be explained in the following with reference to FIGS. 2 - 4 in which reference numeral 1 denotes a first release lever pivoted to a shaft 2 and made anticlockwise rotatable by a spring 3 and having an arm 1a, end surface 1b and bend 1c, 4 denotes a second release lever pivoted to a shaft 5 and made clockwise rotatable by a spring 6 and having a bend 4a lockable to the end surface 1b of the first release lever 1, side surface 4b and arm 4c, 7 denotes a shutter release lever pivoted to the shaft 5 and made anticlockwise rotatable by a spring 8 and having a bend 7 to be pushed by the end surface 4b of the second release lever 4 and another bend 7b, 9 denotes a control lever pivoted to a shaft 10 and made clockwise rotatable by a spring 11 and having a hook 9a engageable with the bend 7b of the shutter release lever 7, arcuated surface 9b, surface 9c and pin 9d to push the arm 4c of the second release lever 4, 12 denotes a front blade locking lever pivoted to a shaft 13 and made anticlockwise rotatable by a spring 14 and having a bend 12a which can be pushed by the surface 9c of the control lever 9, 15 denotes a front blade actuating lever pivoted to a shaft 16 and made anticlockwise rotatable by a spring 17 and having a hook 15a engageable with the bend 12a of the front blade locking lever 12 and, by the way, a rear actuation controlling means including an electromagnet, armature lever and holding lever is omitted but a shutter opening and closing mechanism is formed of the above members.

Reference numeral 21 denotes a sector gear pivoted to a shaft 22 and made anticlockwise rotatable by a spring 23 and having a pin 21a. 24 (FIG. 4) denotes a gear block meshed with the sector gear 21 so as to obtain a delay time of the self-timer. 25 denotes a star gear arranged in the final stage of the gear block 24. 26 denoted an anchor meshed with the star gear 25. 27 denotes a timer lever pivoted to a shaft 28 and made clockwise rotatable by a spring 29 and having an arm 27 which can be pushed by the pin 21a of the sector gear 21, surface 27b and bend 27c. 30 denotes a timer stopper pivoted to the shaft 2 and made anticlockwise rotatable by a spring 31 and having an arm 30a which can be pushed by the bend 1c of the first release lever 1, a bend 30b engageable with the above mentioned star gear 25 and a bend 30c which can be pushed by the surface 27b. 32 denotes a release locking lever pivoted to the shaft 2 and made anticlockwise rotatable by a spring 33 and having a bend 32a which can lock the bend 4a of the second release lever 4 and an arm 32b which can be pushed by the bend 27c of the timer lever 27. By the way, a self-timer mechanism is formed of the above members. The sector gear 21 is so formed as to be cocked from the uncocked state in FIG. 3 to the cocked state in FIG. 2 (from the solid line position to the two-dot chain line position in FIG. 4) by the operation of a timer cocking lever not illustrated.

Figure 2:
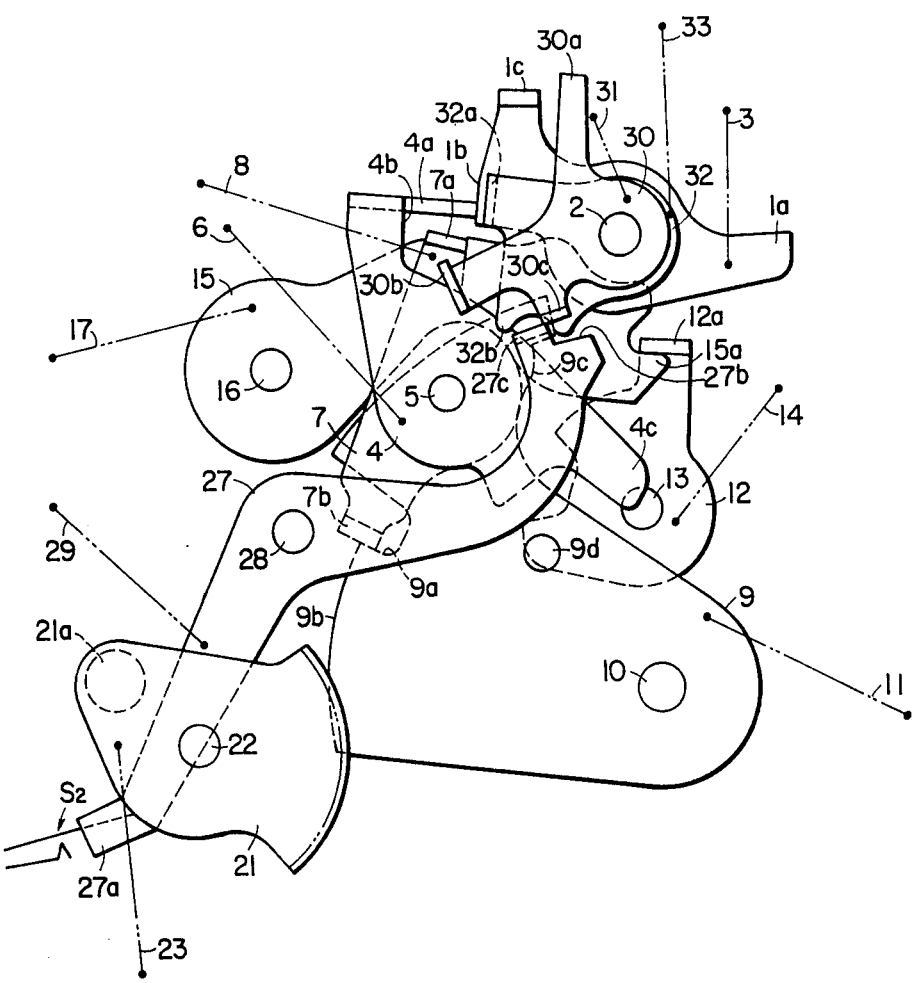
FIG. 2 is a plan view showing as cocked an embodiment of the mechanism part of an electric shutter means according to the present invention.

Reference symbol $S_2$ denotes the auxiliary switch in FIG. 1 which is controlled by the pin 21a of the sector gear 21 so as to open and close, that is to say, to be closed when the self-timer mechanism is not cocked (in the state shown in FIG. 3) but opened when it is cocked (in the state shown in FIG. 2).

Further, the auxiliary switch $S_2$ opened when the self-timer mechanism is cocked will be closed just before the completion of the operation of the self-timer mechanism.

By the way, stoppers for limiting the rotation of each member are omitted.

The operation of the above mentioned electric shutter means shall be explained in the following.

First of all, when a release button of a camera not illustrated is pushed in the state that the shutter opening and closing mechanism and self-timer mechanism are cocked as shown in FIG. 2 (in the state shown by the two-dot chain line in FIG. 4), the current source switch $S_1$ in FIG. 1 will be closed but the auxiliary switch $S_2$ will be opened and therefore no current will be passed to the electromagnet M. On the other hand, for example, by the motion of a reflecting mirror (not illustrated) which will be released to leap up when the release button is pushed, the first release lever 1 will be rotated clockwise against the tension of the spring 3. By this clockwise rotation of the first release lever 1, the bend 4a locked by the end surface 1b will be unlocked and, as a result, the second release lever 4 will be clockwise rotated by the tension of the spring 6 but the clockwise rotating motion of the second release lever will be stopped immediately when the bend 4a collides with the bend 32a of the release locking lever 32. At this time, the side surface 4b will not yet contact the bend 7a of the shutter release lever 7 which will be therefore held in the position in FIG. 2. By the clockwise rotation of the first release lever 1, the bend 1c will be pushed by the arm 30a, the timer stop lever 30 will be clockwise rotated against the tension of the spring 31 and the bend 30b will come out of the star gear 25. As a result, the sector gear 21 will begin to be rotated anticlockwise by the tension of the spring 23 and the auxiliary switch $S_2$ will be pushed by the pin 21a so as to close. Therefore, an electric current will flow to the electromagnet M and a rear blade actuating member not illustrated will be electromagnetically held in a cocked position. On the other hand, for example, in 10 seconds after the beginning of the anticlockwise rotation of the sector gear 21, the arm 27a will be pushed by the pin 21a and the timer lever 27 will be anticlockwise rotated against the tension of the spring 29. Therefore, the arm 32b will be pushed by the bend 27c, the release locking lever 32 will be clockwise rotated against the tension of the spring 33 and the bend 4a of the second release lever 4 locked by the bend 32a will be unlocked. Thereby, the second release lever 4 will be clockwise rotated by the tension of the spring 6, the bend 7a will be pushed by the side surface 4b, the shutter release lever 7 will be clockwise rotated against the tension of the spring 8 and the bend 7b will be released from the hook 9a of the control lever 9.

The unlocked control lever 9 will be clockwise rotated by the tension of the spring 11. By this clockwise rotation of the control lever 9, first the bend 12a will be pushed by the surface 9c, the front blade locking lever 12 will be clockwise rotated against the tension of the spring 14 and the bend 12a will be released from the hook 15a of the front blade actuating lever 15. Therefore, the front blade actuating lever 15 will be anticlockwise rotated by the tension of the spring 17 and the front blade not illustrated will be opened. Further, the arm 4c will be pushed by the pin 9d and the second release lever 4 will be anticlockwise rotated against the tension of the spring 6 to occupy the position rotated further anticlockwise from the position in FIG. 2.

When the time determined by the exposure time controlling circuit shown in FIG. 1 has elapsed, the passage of the electric current to the electromagnet M will be interrupted, the rear blade actuating lever not illustrated will be released and the rear blade will be closed.

Further, when the pressing of the arm 1a is released by the return of the reflecting mirror, the first release lever 1 will be anticlockwise rotated by the tension of the spring 3 and will return to the position in FIG. 1.

Figure 3:
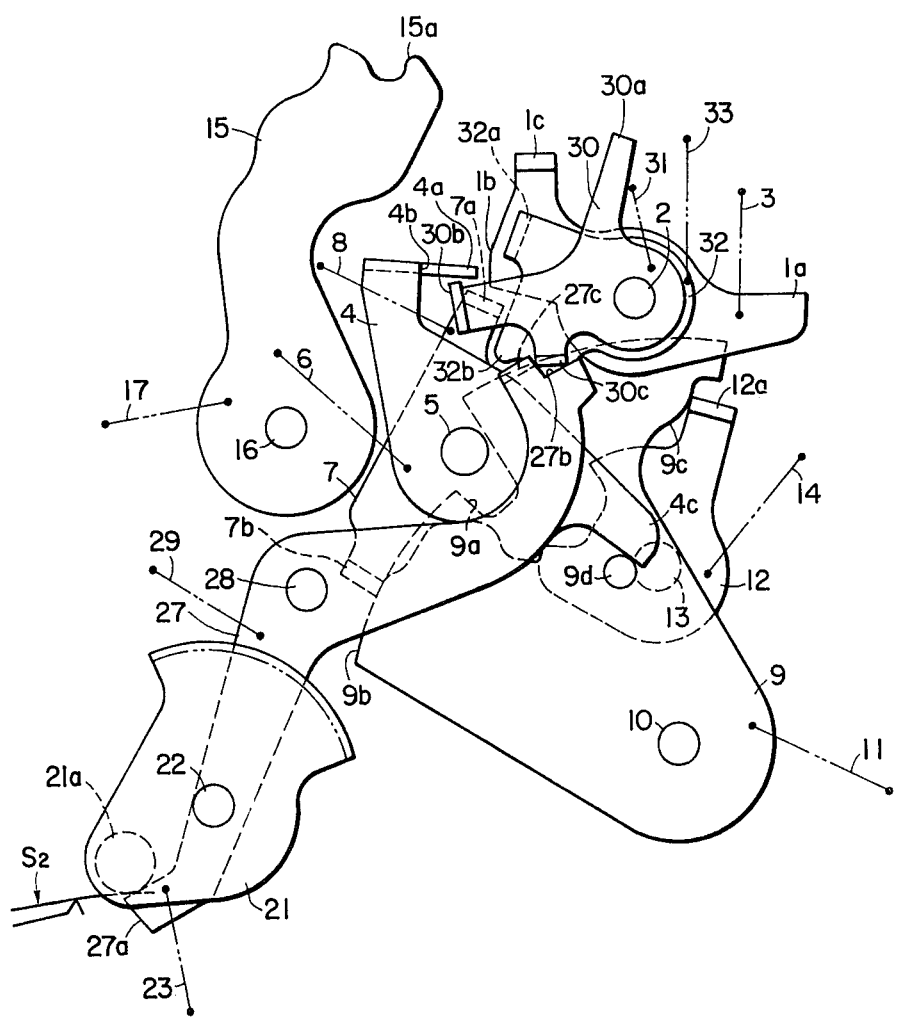
FIG. 3 is a plan view showing as uncocked the mechanism part shown in FIG. 2.
Figure 4:
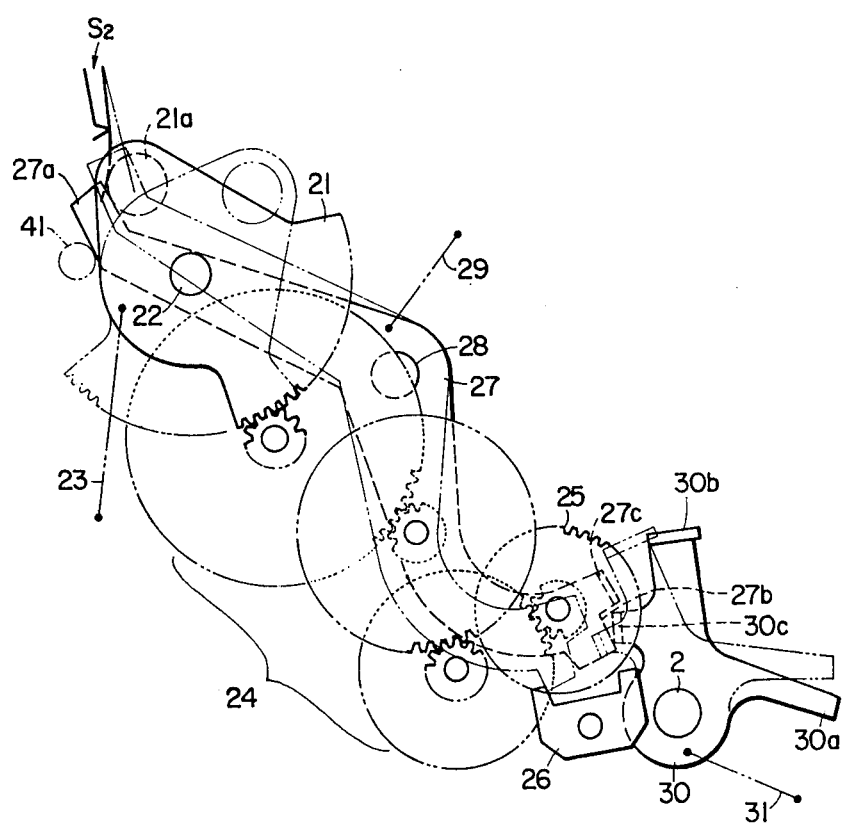
FIG. 4 is a plan view showing a self-timer mechanism part.

Thereby, one exposing operation will be completed and each member will be in the state shown in FIG. 3.

By the way, the shutter mechanism cocking operation will end when the control lever 9 is anticlockwise rotated against the tension of the spring 11, the hook 9a is engaged with the bend 7b of the shutter release lever 7, the front blade actuating lever 15 is clockwise rotated against the tension of the spring 17 and the hook 15a is engaged with the bend 12a of the front blade locking lever 12.

Next, the operation of cocking the self-timer mechanism is made by operating a self-timer cocking member not illustrated. That is to say, when the self-timer cocking member is operated, the sector gear 21 will be rotated against the tension of the spring 23 from the solid line position to the chain line position in FIG. 4. Therefore, the pressing of the pin 21a will be released and the auxiliary switch $S_2$ will be opened. Further, with the rotation of the sector gear 21, the timer lever 27 will be clockwise rotated by the tension of the spring 29, the surface 27b will retreat from the bend 30c of the self-timer stop lever 30 and the bend 27c will retreat from the arm 32b of the release locking lever 32. Therefore, the self-timer stop lever 30 will be anticlockwise rotated by the tension of the spring 31 and the bend 30b will be meshed with the star gear 25. On the other hand, the release locking lever 32 will be anticlockwise rotated by the tension of the spring 33 and the bend 32a will advance into the motion track of the bend 4a of the second release lever 4.

Thus, all the members will be again returned to the cocked state in FIG. 1. At the general photographing time when the self-timer mechanism is not cocked, that is, when the self-timer is not used, the auxiliary switch $S_2$ will remain closed and the release locking lever 32 will be in the position in FIG. 3. Therefore, when the release button is pushed and the current source switch $S_1$ is closed, an electric current will immediately flow to the electromagnet M. When the second release lever 4 locked by the first release lever 1 is unlocked, it will clockwise rotate and will immediately clockwise rotate the shutter release lever 7. Therefore, in such case, immediately after the release button is pushed, the front blade will be opened.

By the way, in the above described explanation, the case that the electric shutter means according to the present invention is constituted to be adapted to single-lens reflex cameras is exemplified and the member opening and closing the exposure aperture is of a blade type. However, this member may be of a curtain type. Further, the electric shutter means of a type that the memorizing and reproducing operation for single-lens reflex cameras is made has been explained. However, the present invention is effective also to an electric shutter means for lens-shutter type cameras of a type that a current source switch for an electric shutter circuit is used in common as a current source switch for an exposure warning circuit and/or exposure time indicating circuit. Further, in the above mentioned embodiment, the passage of the current to the electromagnet is interrupted with the cocking of the self-timer mechanism. However, by connecting a resistor R of a large resistance value in parallel with the auxiliary switch $S_2$ as shown by the dotted line in FIG. 1, the amount of the passed current may be controlled to a minute value by the self-timer mechanism cocking operation. Thus, if the resistor R is connected in parallel with the auxiliary switch $S_2$ so that, when the switch $S_2$ is opened, the resistor R may be connected with the electromagnet M, the operation delay of the electromagnet and sparks generated in opening and closing the switch $S_2$ will be able to be prevented and the electric shutter means will be more convenient.

We claim:

1. An electric shutter means comprising a controlling circuit including therein an electromagnet operable to terminate exposure, a current source switch selectively closed by actuation of a release button to connect said controlling circuit with a current source, an auxiliary switch connected in series with said electromagnet and in parallel with the current source switch, and a self-timer means including therein a sector gear arranged adjacently to said auxiliary switch and movable between a cocked position and an uncocked position for opening and closing said auxiliary switch, said auxiliary switch being opened by said sector gear when said sector gear is cocked, and said auxiliary gear being closed by said sector gear in a final stage of returning motion of said sector gear from its cocked position to its uncocked position.

2. An electric shutter means according to claim 1, in which said electric shutter means further comprises a resistor having a large resistance value connected in parallel with said auxiliary switch.

* * * * *